US012533392B2

(12) United States Patent
O'Neill

(10) Patent No.: US 12,533,392 B2
(45) Date of Patent: Jan. 27, 2026

(54) COMPOSITIONS AND USES THEREOF

(71) Applicant: SkinBioTherapeutics PLC, Macclesfield (GB)

(72) Inventor: Catherine O'Neill, Macclesfield (GB)

(73) Assignee: SkinBio Therapeutics PLC, Macclesfield (GB)

( * ) Notice: Subject to any disclaimer, the term of this patent is extended or adjusted under 35 U.S.C. 154(b) by 0 days.

(21) Appl. No.: 16/302,624

(22) PCT Filed: May 17, 2017

(86) PCT No.: PCT/GB2017/051372
§ 371 (c)(1),
(2) Date: Nov. 17, 2018

(87) PCT Pub. No.: WO2017/199022
PCT Pub. Date: Nov. 23, 2017

(65) Prior Publication Data
US 2019/0290724 A1    Sep. 26, 2019

(30) Foreign Application Priority Data

May 18, 2016 (GB) ..................................... 1608762

(51) Int. Cl.
| *A61K 38/16* | (2006.01) |
| *A61K 8/64* | (2006.01) |
| *A61K 35/747* | (2015.01) |
| *A61K 38/44* | (2006.01) |
| *A61K 38/45* | (2006.01) |
| *A61K 38/51* | (2006.01) |
| *A61K 38/52* | (2006.01) |
| *A61K 38/53* | (2006.01) |
| *A61P 31/04* | (2006.01) |
| *A61Q 17/00* | (2006.01) |
| *A61Q 19/00* | (2006.01) |

(52) U.S. Cl.
CPC .............. *A61K 38/164* (2013.01); *A61K 8/64* (2013.01); *A61K 35/747* (2013.01); *A61K 38/44* (2013.01); *A61K 38/45* (2013.01); *A61K 38/51* (2013.01); *A61K 38/52* (2013.01); *A61K 38/53* (2013.01); *A61P 31/04* (2018.01); *A61Q 17/005* (2013.01); *A61Q 19/00* (2013.01); *C12Y 102/01012* (2013.01); *C12Y 207/01029* (2013.01); *C12Y 402/01011* (2013.01); *C12Y 503/01001* (2013.01); *C12Y 504/02007* (2013.01); *C12Y 603/05006* (2013.01)

(58) Field of Classification Search
None
See application file for complete search history.

(56) References Cited

U.S. PATENT DOCUMENTS

| 7,052,896 B2 * | 5/2006 | Glenn | C07K 14/335 |
| | | | 426/534 |
| 8,445,426 B2 * | 5/2013 | De Vos | C07K 14/335 |
| | | | 514/1.1 |
| 10,702,562 B2 * | 7/2020 | O'Neill | A61K 35/74 |
| 2015/0079040 A1 * | 3/2015 | O'Neill | A61Q 17/005 |
| | | | 424/93.3 |

FOREIGN PATENT DOCUMENTS

| WO | WO-2013/153358 | 10/2013 |
| WO | WO-2015/181534 | 12/2015 |

OTHER PUBLICATIONS

Kankainen et al. PNAS Oct. 2009, vol. 106, No. 40, pp. 17193-17198.*
Reunanen et al. "Characterization of the SpaCBA Pilus Fibers in the Probiotic Lactobacillus rhamnosus GG". Applied and Environmental Microbiology. Apr. 2012 vol. 78, No. 7, pp. 2337-2344.*
Karlsson et al. FEMS Immunol Med Microbiol 2012, 66, pp. 147-156.*
Sanchez et al. "Identification of novel proteins secreted by Lactobacillus rhamnosus GG grown in de Mann-Rogosa-Sharpe broth". Letters in Applied Microbiology 2009, 48, pp. 618-622.*
Lebeer et al. "Exopolysaccharides of Lactobacillus rhamnosus GG form a protective shield against innate immune factors in the intestine". Microbial Biotechnology. 2010, 4(3), pp. 368-374.*
Guha Chowdhury et al. Oral Microbiol Immunol., 1997, 12, pp. 91-97.*
Castaldo et al. Microbiol Cell Factories, 2009, 8: 14, pp. 1-10.*
Ramiah et al. Research in Microbiology, 2008, 159, pp. 470-475.*
Savijoki et al., Comparative proteome cataloging of Lactobacillus rhamnosus strains GG and Lc705, J. Proteome Research, vol. 10(8)3460-3473, Aug. 2011 (ePub Jun. 2011).
Ardita et al., Epithelial Adhesion mediated by Pilin SpaC Is Required for Lactobacillus rhamnosus GG-Induced Cellular Responses, Applied and Environmental Microbiology, vol. 80(16):5068-5077, Aug. 2014.
Bravo et al., Ingestion of Lactobacillus strain regulates emotional behavior and central GABA receptor expression in a mouse via the vagus nerve, PNAS, vol. 108(38): 16050-16055, Sep. 2011.
Ganguli et al., Lactobacillus rhamnosus GG and its SpaC pilus adhesin modulate inflammatory responsiveness and TLR-related gene expression in the fetal human gut, Pediatric Research, vol. 77(4):528-535, Jan. 2015.

(Continued)

*Primary Examiner* — Vera Afremova
(74) *Attorney, Agent, or Firm* — Howson & Howson LLP; Colleen M. Schaller

(57) ABSTRACT

The present invention relates to a composition comprising a probiotic extract, wherein the extract comprises a protein fraction derived from a secretion or lysate and having proteins of a molecular weight of up to 100 kDa. The composition may have a number of uses, such as for use in the prevention, management or treatment of bacterial infection or the enhancement and improvement of skin health.

6 Claims, 4 Drawing Sheets

(56) References Cited

OTHER PUBLICATIONS

Kankainen et al., Comparative genomic analysis of Lactobacillus rhamnosus GG reveals pili containing a human-mucus binding protein, Proc Natl Acad Sci USA 106(40):17193-8, Oct. 2009.

Karlsson et al., Lactobacillus rhamnosus GR-1 enhances NF-kappaB activation in *Escherichia coli*-stimulated urinary bladder cells through TLR4, BMC microbiology, vol. 12(15):1-10, Jan. 2012.

Lebeer et. al., Functional analysis of Lactobacillus rhamnosus GG pili in relation to adhesion and immunomodulatory interactions with intestinal epithelial cells, Appl Environ. Microbiol, vol. 78:185-193, Jan. 2012 (ePub Oct. 2011).

Mohammedsaeed et al., Lactobacillus rhamnosus GG Lysate Increases Re-Epithelialization of Keratinocyte Scratch Assays by Promoting Migration, Scientific Reports, vol. 5(1):2, Nov. 2015.

Mohammedsaeed et. al., Lactobacillus rhamnosus GG Inhibits the Toxic Effects of *Staphylococcus aureus* on Epidermal Keratinocytes, Appl. Environ. Microbiol, vol. 80(18):5773-5781, Sep. 2014.

Prince et. al., Lactobacillus reuteri protects epidermal keratinocytes from *Staphylococcus aureus*-induced cell death by competitive exclusion, Appl Environ. Microbiol. 78(15):5119-26, Aug. 2012 (ePub May 2012).

Sultanna et. al., Strain-dependent augmentation of tight-junction barrier function in human primary epidermal keratinocytes by Lactobacillus and Bifidobacterium lysates, Appl. Environ, Microbiol. 79(16):4887-4894, Aug. 2013.

International Search Report and Written Opinion issued on International Patent Application No. PCT/GB2017/051372, dated Jan. 23, 2018.

Markowicz et al, "SPACBA sequence instability and its relationship to the adhesion efficiency of Lactobacillus casei group isolates to Caco-2 cells." ACTA ABP. Jun. 2014. vol 61. No. Feb. 2014 341-347.

Machine translation of Office Action issued for Japanese Patent Application No. 2018-561009, dated Mar. 15, 2022.

\* cited by examiner

COMPOSITIONS AND USES THEREOF

FIELD OF THE INVENTION

The present invention relates to compositions which are formed of or mimic probiotic bacteria lysates or components thereof. The present invention is particularly suited for use on skin or mucosal membranes.

BACKGROUND TO THE INVENTION

Probiotics have been defined as 'live micro-organisms which, when administered in adequate amounts, confer a health benefit to the host'. Usually members of the genera lactobacilli and bifidobacteria, probiotics have been reported to have beneficial effects when consumed orally, such as prevention of antibiotic associated diarrhoea and prevention of atopic disease. The mechanisms used by the bacteria to exert positive effects are varied and include inhibition of pathogens modulation of the immune response and enhancement of epithelial barrier function. However, in general, the nature of the bacterial molecules underlying probiosis is poorly characterised and there is comparatively little information available regarding the molecular mechanisms mediating the observed effects of probiotics.

Since probiotics may have positive impacts on the gut, their potential effects on other systems, such as the mouth and the urogenital tract have also begun to be investigated. A study examining the impact of oral administration of Lactobacilli in a clinical trial of women with bacterial vaginosis, showed that Lactobacilli could indeed inhibit the colonization of uro-epithelial cells by pathogens. Recently, the topical application of probiotics to the skin has been investigated in a limited number of studies. Topical application of sonicated Streptococcus salivarius strains to patients suffering from atopic dermatitis resulted in improved barrier function apparently through increasing the level of ceramides in the stratum corneum. Topically applied L. plantarum for treatment of infected wounds resulted in improved tissue repair in a mouse burn model and prevention of infection in chronic leg ulcers and burns in humans. However, in general the mechanisms underlying these effects are not well understood.

The mechanism by which L. rhamnosus GG (also referred to herein as LGG) adheres to intestinal mucus has been shown previously to involve Pili which are produced at the surface of LGG and appear to promote retention of LGG in the gastro intestinal tract. Pilus production in LGG is encoded by the gene cluster SpaCBA with the SpaC protein having been shown to be primarily responsible for the high mucus binding activity of LGG.

The inventors have previously demonstrated that probiotic bacteria and lysates thereof in protecting cells against infection by pathogenic bacteria such as S. aureus (see WO2013/153358 and WO2015/181534). Staphylococcus aureus is both a transient coloniser of skin and a major opportunistic skin pathogen, causing diseases ranging from impetigo to life threatening conditions such as sepsis. They have now demonstrated that LGG can protect epidermal keratinocytes from the toxic effects of S. aureus. Specifically, LGG inhibits S. aureus adhesion to primary human keratinocytes and can both competitively exclude and displace S. aureus from keratinocyte binding sites. This leads to an increase in keratinocyte survival in the presence of S. aureus. Importantly, the inventors have shown that this effect is produced by a cell free lysate of LGG showing that live bacteria were not necessary for the positive effects of LGG in inhibiting S. aureus adhesion and this discovery could be used in a number of therapeutic and cosmetic product applications.

SUMMARY OF THE INVENTION

The invention is defined in the appended claims and also includes the combination of the aspects and preferred features hereinafter described except where such a combination is clearly impermissible or expressly avoided.

In accordance with an aspect of the present invention, there is provided a composition comprising a probiotic extract, wherein the extract comprises a protein fraction derived from a secretion or lysate and having proteins of a molecular weight of up to about 100 kDa.

The extract may be from one or more probiotic strains. It is preferred that the probiotic strain is a Lactobacilli, such as L. rhamnosus.

Preferably, the proteins have a molecular weight of up to about 90 kDa, or a molecular weight in the range of about 9 to about 90 kDa. More preferred, the proteins have a molecular weight in the range of about 25 to about 90 kDa. Most preferred, the proteins have a molecular weight in the range of about 27 kDa to about 90 kDa.

The protein fraction will preferably comprise the Subtilin biosynthesis protein C (SpaC) and proteins having a molecular weight of up to about 50 kDa, and optionally one or more exopolysaccharides. If the protein fraction comprises SpaC, then it is preferred that it also comprise proteins having a molecular weight of up to about 49 kDa, up to about 48 kDa, or up to about 47 kDa. If the protein fraction comprises SpaC, then it may also comprise proteins having a molecular weight in the range of about 20 kDa to 50 kDa, or in the range of about 25 kDa to about 49 kDa, or in the range of about 26 kDa to about 48 kDa, or in the range of about 27 kDa to about 47 kDa.

Preferably, the proteins having a molecular weight of up to about 50 kDa comprise one or more of the following: Glyceraldehyde-3 phosphate dehydrogenase (GAPDH); Elongation factor TU (EF-Tu); Triosephosphate isomerase (TPI); and/or Enolase.

In accordance with a related aspect of the invention, there is provided a composition comprising the SpaC protein and one or more of the following proteins: Glyceraldehyde-3 phosphate dehydrogenase (GAPDH); Elongation factor TU (EF-Tu); Triosephosphate isomerase (TPI); Enolase; Acyl carrier protein; Transcription elongation factor greA; Phosphopentomutase; 50S ribosomal protein S11; Dihydroxyecetone kinase; 50s Ribosomal protein; Asparaginyl tRNA synthetase; UPF0342 protein; and/or 50S ribosomal protein L22.

In this related aspect, the one or more of the following proteins may comprise: Glyceraldehyde-3 phosphate dehydrogenase (GAPDH); Elongation factor TU (EF-Tu); Triosephosphate isomerase (TPI); and/or Enolase.

If desired, one or more of the proteins may be recombinant and/or derived from a secretion or lysate of a probiotic. If one or more of the proteins are derived from a secretion or lysate of a probiotic, it is preferred that the probiotic is L. rhamnosus. If one or more of the proteins are recombinant, it is preferred that these proteins have an amino acid sequence which is identical or similar to the protein in L. rhamnosus. It will be apparent to the skilled addressee that the amino acid sequence may be optimised for expression and/or biological activity.

The inventions of both aspects particularly relate to probiotic bacteria of the species Lactobacillus rhamnosus.

Such bacteria were originally considered a subspecies of *Lactobacillus casei*, but later genetic research found it to be a species of its own. A number of *L. rhamnosus* strains are known. For example, strains I-1720 (Pasteur collection Nationale de Cultures de Microorganismes), AC413, GR-1 (Karlsson et al., BMC microbiology 2012, 12:15), JB-1 (Bravo et al., PNAS 2011 108(38) 16050-16055) GG and LC705 (Savijok et al., J. Proteome Research 2011 10(8) 3460-3474). Other strains of *L. rhamnosus* may be readily isolated.

In particular, the invention relates to *L. rhamnosus* GG. *L. rhamnosus* GG (also referred to herein as LGG) is deposited at ATCC (American Tissue Culture Collection) under accession number ATCC 53103. LGG was isolated in 1983 from the intestinal tract of a healthy human being by Gorbach and Goldin.

The compositions according to the aspects of the invention may further comprise one or more pharmaceutically or cosmetically acceptable ingredients or excipients. The compositions according to the aspects of the invention may further comprise a carrier. The carrier is usually a solution in which the secreted or lysed material is dissolved, suspended, diluted or admixed.

In some cases the carrier may comprise the medium which has been in contact with the bacterium during culturing. The composition of the medium will have changed during the culture, for example by the secretion of material from the bacterium. The compositions may consist or comprise culture medium in which the bacteria have been grown.

Media suitable for culturing bacteria (such as *L. rhamnosus*) is well known to those of skill in the art. As used herein the terms "media" and "medium" encompasses any nutrient containing liquid in which bacteria may be supported, kept alive, grown and/or expanded. The media may contain the minimal nutrients to support bacterial life, and optionally other nutrients. Exemplary nutrients contained within the broth include sugar, magnesium, phosphate, phosphorous and sulphur. The media may be made to, or modified from, a combination of nutrients that is well known in the art, such as Wilkins-Chalgren Broth. Media may be obtained pre-mixed from a commercial source, or may be made in-house.

Preferably the composition is cell free and does not contain any live bacterial cells. The whole bacterial cells may have been removed from the media, for example by centrifugation and/or filtration. For example, the bacteria may be removed by sedimenting them from the media in a centrifuge at 15,000×g for a period of time sufficient for substantially all of the bacteria to sediment from the media. The media may be filtered using a microporous filter with pores of a suitable size to remove substantially all of the bacteria from the media. These methods may remove intact bacteria, and may also remove bacterial debris, if the extract is derived by cell lysis.

The composition may be sterile. That is to say that the composition has been subject to a sterilisation process, such as irradiation, heat, chemicals, pressure or filtration, or any combination thereof. However, such sterilisation procedures must be adapted so as not to damage or reduce the efficacy of the relevant proteins. In the case of media containing an extract, the media may have been sterilised before the probiotic bacteria were introduced and cultured, and also after the bacteria had been removed from that media.

In some cases the extract of the composition contains substantially no intact bacteria. The composition may also be substantially free from lysed bacteria or bacterial fragments. The intact bacteria and/or lysed bacteria or bacterial fragments may have been separated from the extract. Separation may occur by any suitable means known in the art, such as centrifugation or filtration. By "substantially free from" we mean that the extract contains no or minimal contamination of non-secreted bacterial components, such as whole bacteria, lysed bacteria, or bacterial fragments. Thus, the composition may contain 100% extract, at least 99% extract, at least 95% extract, at least 90% extract, at least 85% extract, at least 80% extract, at least 75% extract or at least 70% extract. The extract may comprise additional components of non-bacterial origin, such as carrier solutions, other active agents, or preservatives, as described herein.

Compositions as described herein may be prepared by culturing a bacteria in media, separating the bacteria from the media, and preparing a composition from the media. The bacteria may be cultured under anaerobic conditions. The bacteria may be cultured at a temperature above the normal temperature of the human body. The bacteria may be cultured at 30° C., 31° C., 32° C., 33° C., 34° C., 35° C., 36° C., 37° C., 38° C., 39° C., 40° C. or 41° C. Preferably the bacteria are cultured at 37° C. The bacteria may be cultured in the media for 1 day, 2 days, 3 days, 4 days, 5 days, 6 days, 7 days, 8 days, 9 days, 10 days, 11 days, 12 days, 13 days or 14 days. The bacteria or lysed bacteria or fragments of bacteria may be separated from the media by centrifugation, such as centrifugation at 15000×g. The media may be separated from the bacteria, lysed bacteria or fragments of bacteria by filtration. The media may be separated by a combination of filtration and centrifugation. The media may be subject to sterilisation, before or after the bacteria are removed. For example, following separation of the media from the whole bacteria, lysed bacteria or bacterial fragments, the media may be subject to sterilisation. The media may be subject to concentration, such that the proportion of extract increases relative to the total volume of media. Concentration may occur by any method known in the art, such as evaporation. The extract may be separated from the media. Any method of separating material from a carrier solution may be used. For example the extract may be separated from the media by chromatography, crystallisation, distillation, drying, electrophoresis or precipitation. Once isolated from the media, or concentrated in the media, the extract may be dissolved or diluted in a carrier, or otherwise formulated into a composition as disclosed herein.

The extract may have undergone one or more methods in order to obtain the relevant protein fraction. The protein fraction may have been obtained using acetonitrile fractionation or any other suitable fractionation technique.

The compositions of the present invention are useful in the treatment of a wide range of diseases and conditions. In particular they are useful in the improving skin health and the treatment, management and prevention of skin infections, including bacterial infections. In particular, the compounds and compositions are useful in the treatment, management or prevention of *S. aureus* infections. The compounds and compositions are particularly useful in the treatment of soft tissue bacterial infections, such as skin infections. The compounds and compositions of the present invention are particularly useful in the prevention, management or treatment of *S. aureus* skin infections.

The invention relates to the prevention, management or treatment of infections. The composition may be formulated for use as an anti-microbial composition. Anti-microbial compositions may have a broad spectrum of activity against a range of microorganisms (such as bacteria, viruses and yeasts). The composition may be formulated for use as an anti-bactieral composition. In particular, the composition of the present invention may be formulated for use in inhibiting colonisation or preventing recolonisation by a microbe. The probiotic compositions of the present invention exhibit anti-infection activity. For example, anti-adhesion activity, including preventing the adhesion of *S. aureus* to cells and enhanced keratinocyte migration and proliferation improving the skins barrier to infection Thus, the compositions are useful for the prevention, management or treatment of infections including microbial infections, such as the prevention, management or treatment of multi-drug resistant bacterial infections, hospital acquired bacterial infections, antibiotic resistant bacterial infections, infections by gram negative and/or gram positive bacterial infections. The compositions are also useful for use in the prevention, management and treatment of a microbial colonisation.

The compositions of the invention are useful in the prevention of microbial infections by *Staphylococcus* spp., such as *S. saprophyticus, S. xylosus, S. lugdenensis, S. schleiferi, S. caprae, S. epidermidis, S. saprophyticus, S. warneri, S. aureus, S. hominis*, Methicilin resistant *S. aureus* (MRSA), and *Streptococcus* species *S. pyogenes, S. salivarius, S. mutans* and *S. pneumoniae*.

In particular the compositions of the invention exhibit anti-*Staphylococcus* adhesion activity, and are therefore useful in the prevention, management or treatment of *Staphylococcus* infection. For example, the compositions of the invention exhibit anti-*Staphylococcus aureus* activity, and are therefore useful in the prevention, management or treatment of *S. aureus* infections.

Infections occur where disease causing microorganisms invade the tissues of the body. Multiplication of those microorganisms and the toxins that they produce react with the tissues of the body, often causing immune reactions by the infected host. Infections may occur via any of the tissues of the body. In particular aspects the invention relates to the treatment, management or prevention of infection of the external surface of the body, and particularly the skin. However, the invention also relates to the treatment, management or prevention of infection of a mucosal membrane, and particularly respiratory tract and the genital tract mucosal membranes. The invention may also be used for the treatment, management, or prevention of infections of mucosal membranes of the gastrointestinal tract.

The compositions according to the invention may be used in the prevention, management or treatment of skin infections. The compositions according to the invention may also be used in the prevention, management of colonisation and in particular skin colonisation. The infection may be due to a bacterium, such as a *Staphylococcus* species, including *S. aureus*, and MRSA. The composition may be applied separately, sequentially or simultaneously with exposure to the infective agent. Preferably, the composition is applied before exposure to the infective agent.

The compositions of the invention are preferably used for the prevention, management of bacterial infection. They are preferentially administered to a subject before that subject is exposed to the infective agent, such as *S. aureus*. The subject may have been identified as being at risk of infection by the infective agent. Subjects may be identified as being at risk of infection by an infective agent because of their environment, for example being situated in an environment where the inventive agent is known to exist, or due to the health of the subject, such as the existence of an open wound or poor immune health. For example, the compositions may be used in a hospital or other clinical environment in which a pathological bacteria is known to, or suspected to, be present, or there is a need to prevent colonisation by a an antimicrobial resistant organism such as MRSA.

In some cases, the patient is about to undergo, or has recently undergone, surgery. The compositions described herein may be used to prevent infection of an open wound such as a surgical incision or graft by a pathogenic bacteria or reduce the risk of infection by preventing colonisation of body sites.

In some cases the subject is determined not to have an infection by the infective agent. For example, the subject may be determined not to have a *S. aureus* infection. Methods for determining whether a subject has an infection are well known in the art, and may include the analysis of a sample obtained from the subject for the presence of the infective agent.

A composition may be administered alone or in combination with other treatments, either simultaneously or sequentially dependent upon the condition to be treated.

The composition may be dissolved in, suspended in, or admixed with one or more other pharmaceutically acceptable ingredients.

In some embodiments, the composition may be provided as a suspension in a pharmaceutically acceptable excipient, diluent or carrier.

The invention also provides antibacterial compositions in the form of cleaning products, washes, surface coatings or other compositions which are not for medical treatment of the human or animal body.

The composition may be for use in decreasing adhesion of a *Staphylococcus* bacterium from a substrate.

Such compositions may be useful for removing, killing, or preventing the accumulation, colonisation or recolinisation of bacteria on a surface, or inhibiting the action or growth of the bacteria. The composition is formulated as an antibacterial composition.

Anti-bacterial compositions according to the invention may be useful for treating biomaterials, implants and prosthesis (including stents, valves, eyes, hearing aids, gastric bands, dentures, artificial joint replacements etc), surgical instruments or other medical devices prior to administration to, or treatment of, or use with, a patient or subject. The antibacterial compositions may be useful for treating surfaces prone to colonisation or exposure to bacterial, such as handrails, food preparation surfaces, kitchen surfaces or equipment, tables, sinks, toilets or other bathroom hardware, Antibacterial compositions may comprise agents in addition to the lysate, such as cleaning agents, stabilisers, anionic surfactants, perfumes, chelating agents, acids, alkalis, buffers or detergents. Such agents may facilitate or enhance the antibacterial properties of the agent, such as killing or inhibiting bacteria, or preventing the recolonisation of the cleaned surface.

The present invention also gives rise to a method of preparing a surface comprising applying composition to the surface. The method may result in reduced colonisation of the surface by pathogenic microorganisms.

The composition may be formulated for use as a keratinocyte modifier. The modifier may enhance the proliferation and/or migration of keratinocytes. The modifier may be used to improve skin and/or wound repair.

The composition may be for use in the treatment or management of a condition involving keratinocytes or damaged skin, skin disorders or wound care In accordance with related aspect, there is provided a composition for use as a cosmetics preparation for the skin.

In accordance with a related aspect, there is provided the use of the composition as herein above described for use in the manufacture of a medicament for the management or treatment of a condition involving keratinocytes or damaged skin In accordance with another related aspect, there is provided use of the composition as herein above described for use in the manufacture of a medicament or cosmetic product for the enhancement of the proliferation and/or migration of keratinocytes.

Whilst it is possible for the composition to be used alone, it is preferable to present it as a formulation comprising the material and a carrier. The composition may be dissolved in, suspended in, or admixed with one or more other ingredients. In some cases the composition is presented in a liposome or other microparticulate. Formulations disclosed herein include skin care, wound care, respiratory care and oral care formulations, including medical, personal care and consumer products and treatments to prevent or reduce the incidence of Health Care Acquired Infections Formulations may suitably be in the form of liquids, solutions (e.g., aqueous, non-aqueous), suspensions (e.g., aqueous, non-aqueous), emulsions (e.g., oil-in-water, water-in-oil), elixirs, syrups, electuaries, mouthwashes, drops, tablets (including, e.g., coated tablets), granules, powders, lozenges, pastilles, capsules (including, e.g., hard and soft gelatin capsules), cachets, pills, ampoules, boluses, suppositories, pessaries, tinctures, gels, pastes, ointments, creams, lotions, oils, foams, sprays, mists, or aerosols.

Formulations may suitably be provided as a patch, adhesive plaster, bandage, dressing, or the like which is impregnated with one or more active compounds and optionally one or more other pharmaceutically acceptable ingredients, including, for example, penetration, permeation, and absorption enhancers. Formulations may also suitably be provided in the form of a depot or reservoir.

In some formulations, the composition is formulated with one or more pharmaceutically acceptable ingredients. Pharmaceutically acceptable ingredients are well known to those skilled in the art, and include, but are not limited to, pharmaceutically acceptable carriers, adjuvants, excipients, diluents, fillers, buffers, preservatives, anti-oxidants, lubricants, stabilisers, solubilisers, surfactants (e.g., wetting agents), masking agents, colouring agents, flavouring agents, and sweetening agents. The formulation may further comprise other active agents, for example, other therapeutic or prophylactic agents.

Certain products and formulations herein are suitable for skin care or wound care. "Skin care" means topical personal care and/or health care products including products useful for the treatment of adult or infant skin to maintain or improve the health of the skin or improve the appearance of the skin. Skin care may also encompass certain skin conditions, such as atopic dermatitis, psoriasis and eczema. "Wound care" includes products for the treatment of a wound to assist in the closure or healing of the wound, and/or to reduce the pain or scarring associated with the wound, maintaining or improving the health of such tissue or skin, repairing such tissue or skin, and reducing irritation, itching and/or redness of such tissue or skin.

In some embodiments the composition according to the invention is formulated for topical administration, particularly for use or application to, or on, the skin.

Formulations suitable for topical administration include gels, pastes, ointments, creams, lotions, and oils, as well as patches, adhesive plasters, bandages, dressings, depots, cements, glues, and reservoirs.

Ointments are typically prepared from the composition and a paraffinic or a water-miscible ointment base.

Creams are typically prepared from the extract and an oil-in-water cream base. If desired, the aqueous phase of the cream base may include, for example, at least about 30% w/w of a polyhydric alcohol, i.e., an alcohol having two or more hydroxyl groups such as propylene glycol, butane-1, 3-diol, mannitol, sorbitol, glycerol and polyethylene glycol and mixtures thereof. The topical formulations may desirably include a compound which enhances absorption or penetration of the active compound through the skin or other affected areas. Examples of such dermal penetration enhancers include dimethylsulfoxide and related analogues.

Emulsions are typically prepared from the probiotic bacterium or lysate and an oily phase, which may optionally comprise merely an emulsifier (otherwise known as an emulgent), or it may comprises a mixture of at least one emulsifier with a fat or an oil or with both a fat and an oil. Preferably, a hydrophilic emulsifier is included together with a lipophilic emulsifier which acts as a stabiliser. It is also preferred to include both an oil and a fat. Together, the emulsifier(s) with or without stabiliser(s) make up the so-called emulsifying wax, and the wax together with the oil and/or fat make up the so-called emulsifying ointment base which forms the oily dispersed phase of the cream formulations.

Suitable emulgents and emulsion stabilisers include Tween 60, Span 80, cetostearyl alcohol, myristyl alcohol, glyceryl monostearate and sodium lauryl sulphate. The choice of suitable oils or fats for the formulation is based on achieving the desired cosmetic properties, since the solubility of the active compound in most oils likely to be used in pharmaceutical emulsion formulations may be very low. Thus the cream should preferably be a non-greasy, non-staining and washable product with suitable consistency to avoid leakage from tubes or other containers. Straight or branched chain, mono- or dibasic alkyl esters such as di-isoadipate, isocetyl stearate, propylene glycol diester of coconut fatty acids, isopropyl myristate, decyl oleate, isopropyl palmitate, butyl stearate, 2-ethylhexyl palmitate or a blend of branched chain esters known as Crodamol CAP may be used, the last three being preferred esters. These may be used alone or in combination depending on the properties required. Alternatively, high melting point lipids such as white soft paraffin and/or liquid paraffin or other mineral oils can be used.

Some products and formulations described herein are suitable for oral care. "Oral care" means products for use and/or uses of materials in the oral cavity or any portion thereof, including products for use on the teeth, mucosa, tongue, and the like. Products and uses in the field of oral care include those intended for tooth aesthetics including, for example, tooth whitening, stain prevention, and the like, as well as anti-plaque, anti-gingivitis, anti-sensitivity, anti-caries, breath freshening, dry mouth relief, erosion repair and prevention, active delivery and retention, sensory enhancement and mouth feel alteration, and the like.

Formulations for oral care include dental sprays, mouthwashes, toothpastes, lozenges, antibacterial washes, drinks (e.g. milk, yoghurt), food items (such as yoghurt, ice cream, candy bars), or powdered foods (such as powdered milk). Formulations suitable for oral care include formulations suitable for oral and/or buccal administration.

Formulations suitable for oral administration (e.g., by ingestion) include liquids, solutions (e.g., aqueous, non-aqueous), suspensions (e.g., aqueous, non-aqueous), emulsions (e.g., oil-in-water, water-in-oil), elixirs, syrups, electuaries, tablets, granules, powders, capsules, cachets, pills, ampoules, boluses.

Formulations suitable for buccal administration include mouthwashes, losenges, pastilles, as well as patches, adhesive plasters, depots, and reservoirs. Losenges typically comprise the active compound in a flavored basis, usually sucrose and acacia or tragacanth. Pastilles typically comprise the active compound in an inert matrix, such as gelatin and glycerin, or sucrose and acacia. Mouthwashes typically comprise the active compound in a suitable liquid carrier.

Some formulations disclosed herein are suitably provided as a patch, adhesive plaster, bandage, dressing, or the like which is impregnated with, or coated with, one or more composition according to the invention and optionally one or more other pharmaceutically acceptable ingredients, including, for example, penetration, permeation, and absorption enhancers. The composition may also be provided in the form of coatings for medical devices such as implants, prosthetics, surgical instruments, gloves, catheters, valves, pacemakers and the like.

Some compositions and formulations disclosed herein are suitable for respiratory care. "Respiratory care" means products for the treatment of conditions including prevention and treatment of rhinitis, sinusitis, seasonal allergies, nasal congestion and colds. The compositions may be useful for preventing bacterial colonisation or infection of the respiratory tract, including the nares, sinuses, airways, throat or lungs. In some cases such formulations are formulated for intranasal administration or pulmonary administration.

Formulations suitable for intranasal administration, where the carrier is a liquid, include, for example, nasal spray, nasal drops, or by aerosol administration by nebuliser, include aqueous or oily solutions of the active compound.

Formulations suitable for intranasal administration, where the carrier is a solid, include, for example, those presented as a coarse powder having a particle size, for example, in the range of about 20 to about 500 microns which is administered in the manner in which snuff is taken, i.e., by rapid inhalation through the nasal passage from a container of the powder held close up to the nose.

Formulations suitable for pulmonary administration (e.g., by inhalation or insufflation therapy) include those presented as an aerosol spray from a pressurised pack, with the use of a suitable propellant, such as dichlorodifluoromethane, trichlorofluoromethane, dichoro-tetrafluoroethane, carbon dioxide, or other suitable gases.

Compositions and formulations according to the invention may further comprise other active agents, for example other anti-bacterial agents such as bactericidal agents.

In some embodiments a formulation for use according to the present invention may comprise at least about 0.01%, about 0.05%, about 0.1%, about 0.2%, about 0.3%, about 0.4%, about 0.5%, about 0.6%, about 0.7%, about 0.8%, about 0.9%, about 1.0%, about 1.5%, about 2.0%, about 3.0%, about 4.0%, about 5.0%, about 6.0%, about 7.0%, about 8.0%, about 9.0%, about 1 0.0%, about 11.0%, about 12.0%, about 13.0%, about 14.0%, about 15.0%, about 16.0%, about 17.0%, about 18.0%, about 19.0%, about 20.0%, about 25.0%, about 30.0%, about 35.0%, about 40.0%, about 45.0%, about 50.0% by weight of the composition.

In some embodiments the formulation may comprise, one of at least about 0.01% to about 30%, about 0.01% to about 20%, about 0.01% to about 5%, about 0.1% to about 30%, about 0.1% to about 20%, about 0.1% to about 15%, about 0.1% to about 10%, about 0.1% to about 5%, about 0.2% to about 5%, about 0.3% to about 5%, about 0.4% to about 5%, about 0.5% to about 5%, about 1% to 10 about 5%, by weight of the composition.

The probiotic preparations according to the invention may be formulated as pharmaceutical compositions for clinical use and may comprise a pharmaceutically acceptable carrier, diluent or adjuvant. They may be formulated for topical administration.

Administration is preferably in a prophylactically or therapeutically effective amount, this being an amount sufficient to show benefit to the individual. The actual amount administered, and rate and time-course of administration will depend on the nature and severity of the disease being treated. Prescription of treatment, e.g. decisions on dosage etc., is within the responsibility of general practitioners and other medical doctors, and typically takes account of the disorder to be treated or prevented, the condition of the individual patient, the site of delivery, the method of administration and other factors known to practitioners. Examples of the techniques and protocols mentioned above can be found in Remington's Pharmaceutical Sciences, $20^{th}$ Edition, 2000, pub. Lippincott, Williams & Wilkins. It will be appreciated by one of skill in the art that appropriate dosages of the active compounds and compositions comprising the active compounds can vary from patient to patient.

The compositions of the present invention may be formulated as medicaments, that is to say formulated as a medicine, or a medical device. The medicament may include other pharmaceutically acceptable ingredients well known to those skilled in the art, including, but not limited to, pharmaceutically acceptable carriers, adjuvants, excipients, diluents, fillers, buffers, preservatives, anti-oxidants, lubricants, stabilisers, solubilisers, surfactants (e.g. wetting agents), masking agents, colouring agents, flavouring agents, and sweetening agents. The formulation may further comprise other active agents, for example other therapeutic or prophylactic agents.

The compositions of the present invention may be formulated as cosmetics, that is to say formulated as a cosmetics product. The cosmetics product may include other cosmetically acceptable ingredients well known to those skilled in the art, including, but not limited to, cosmetically acceptable carriers, excipients, diluents, fillers, buffers, preservatives, anti-oxidants, lubricants, stabilisers, solubilisers, surfactants (e.g. wetting agents), masking agents, colouring agents, fragrance agents.

Aspects and embodiments of the present invention will now be illustrated, by way of example, with reference to the accompanying figures. Further aspects and embodiments will be apparent to those skilled in the art. All documents mentioned in this text are incorporated herein by reference.

BRIEF DESCRIPTION OF THE FIGURES

Embodiments and experiments illustrating the principles of the invention will now be discussed with reference to the accompanying figures in which.

A: A combination of *S. aureus* (S.a) and *L. rhamnosus* GG lysate (Lgg lys) resulted in a significantly higher percentage of viable keratinocytes than in monolayers infected with *S. aureus* alone (p=0.006). All data are compared to viability of untreated monolayers (Con). Heat (Lgg+heat) or protease treatment (Lgg+tryp) destroyed the ability of the lysate to protect keratinocytes from *S. aureus*.

B: When the lysate was fractionated and proteins eluted in 10-70% acetonitrile, proteins with efficacy against *S. aureus* were contained in fractions 30-60%. NS=Non-Significant. * denotes significant data.

Figure 2:
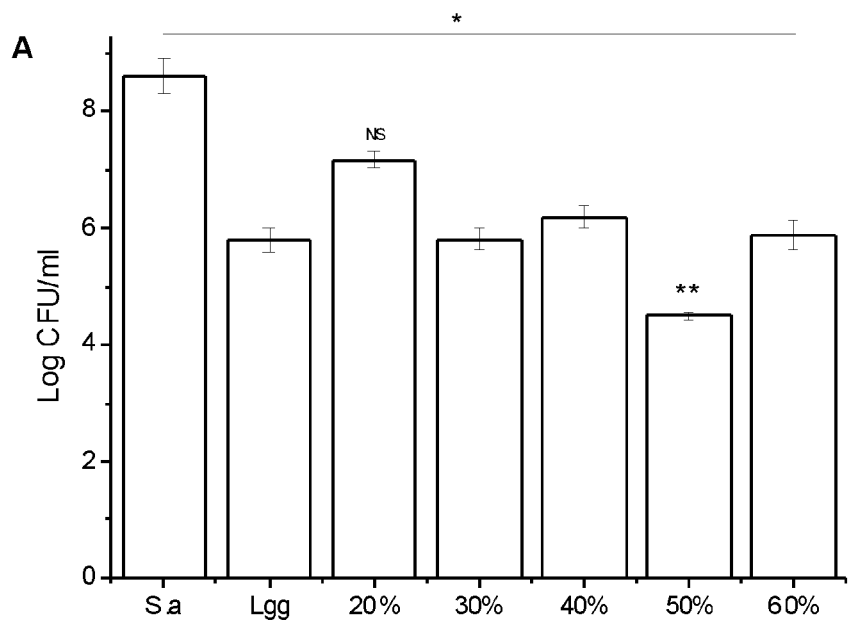
Figure 2:
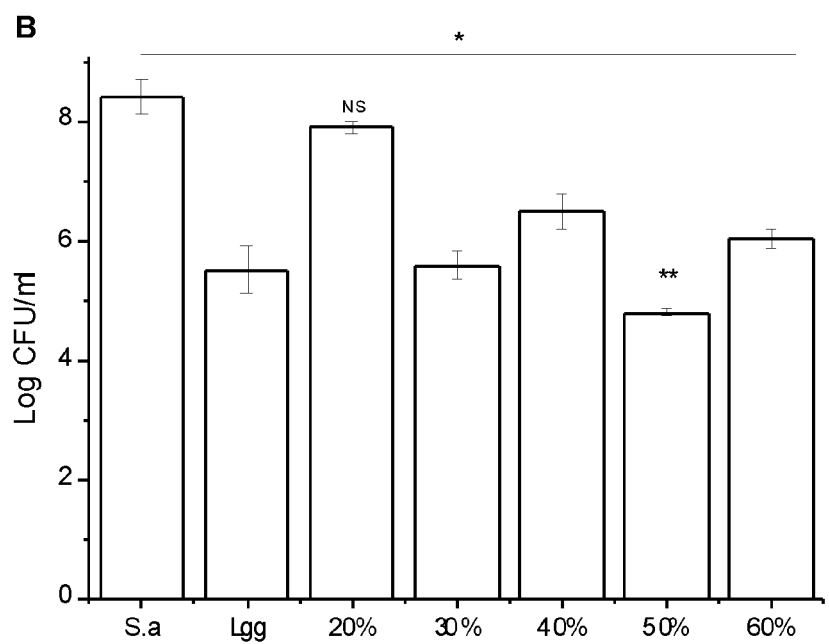

FIG. 2: Specific Fractions inhibit Staphylococcal adhesion to keratinocytes

A: Cells pre-treated with *L. rhamnosus* GG lysate (LGG lys) had significantly fewer adherent Staphylococci compared to cells infected with *S. aureus* (SA) alone. The adhesion of the pathogen to keratinocytes was significantly lower in cultures treated with fractions eluting in 30%, 40%, 50% and 60% acetonitrile (P=0.01, P=0.016 P=0.012, P=0.015 respectively, n=3).

B: The same fractions were also efficatious when added to keratinocytes 2 hours after incubation with pathogen (P=0.034, P=0.035, P=0.01, P=0.033 for 0%, 40%, 50% and 60% respectively, n=3). There was no difference between the numbers of staphylococci adherent to cells exposed to 20% acetonitrile fractions in either assay (P=0.06, n=3). However, there was a significant difference in the number of adherent staphylococci adherent to cells exposed to 50% acetonitrile fraction compared with other fractions in both assays (*P=0.02). Results are expressed as the mean±SEM, *P<0.05. N.S=Non-Significant.

Figure 3:
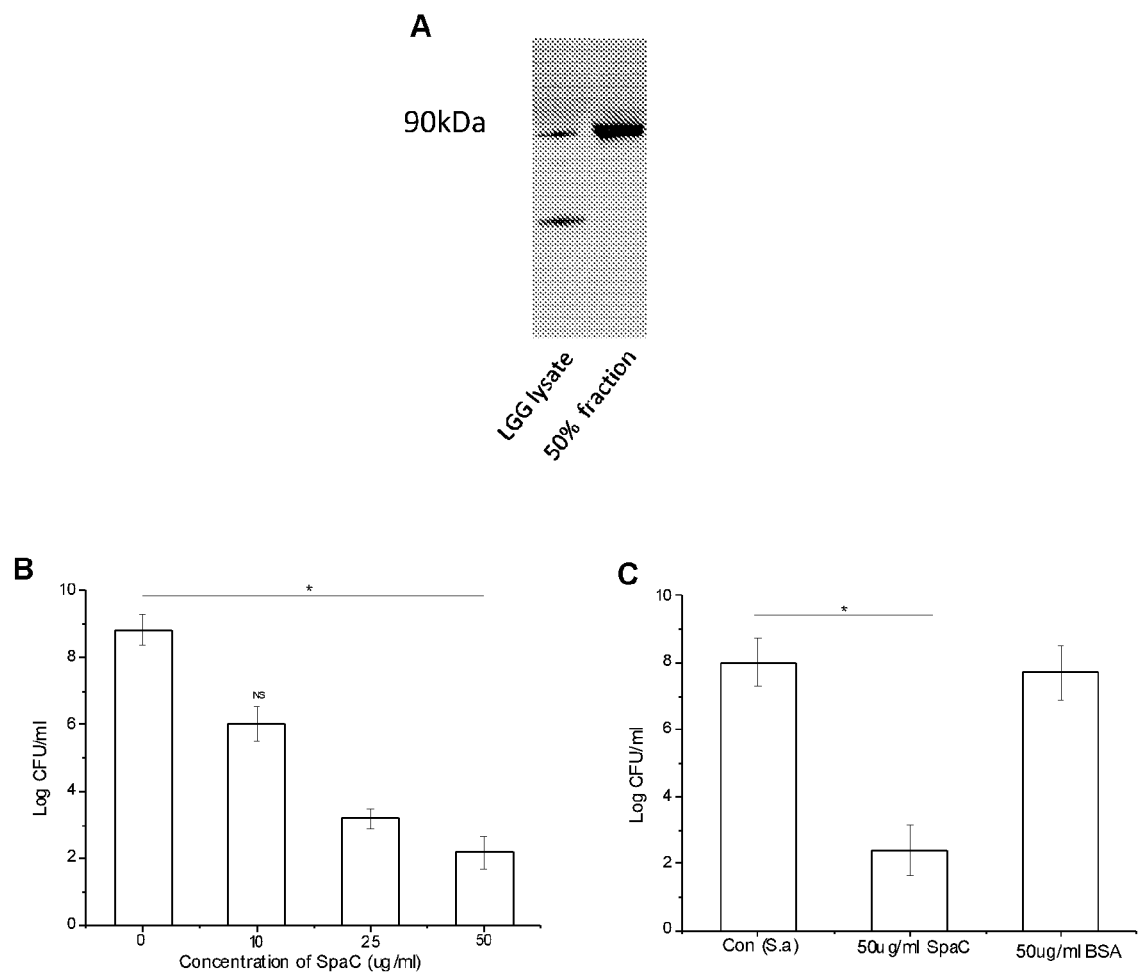

FIG. 3: The pilus protein SpaC is involved in the antiadhesive function of the lysate A: Immunoblotting with specific anti-SpaC serum demonstrated the presence of the SpaC protein in the 50% fraction.

B: recombinant SpaC (rSpaC) inhibited staphylococcal adhesion to keratinocytes in a dose dependent manner with 25 and 50 ug/ml rSpaC providing significant protection (0.03 and 0.013 respectively).

C: 50 µg/ml of BSA, did not inhibit staphylococcal adhesion.

Figure 4:
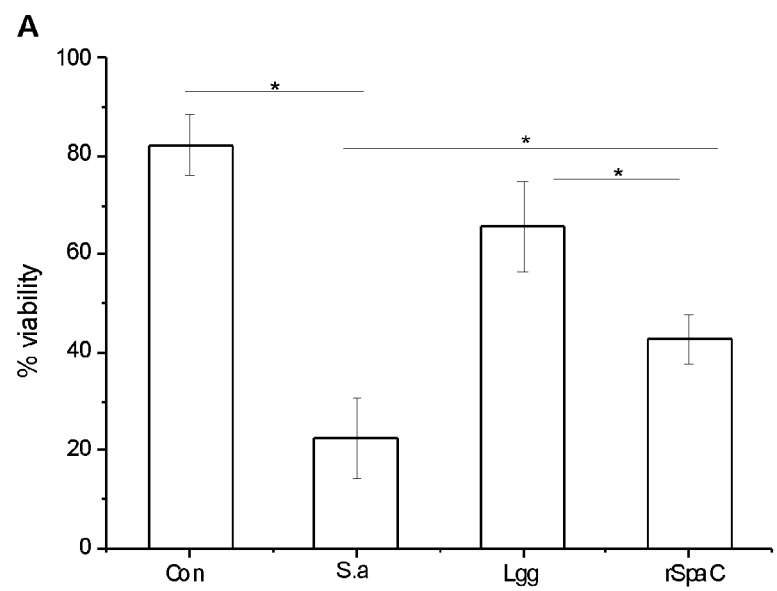
Figure 4:
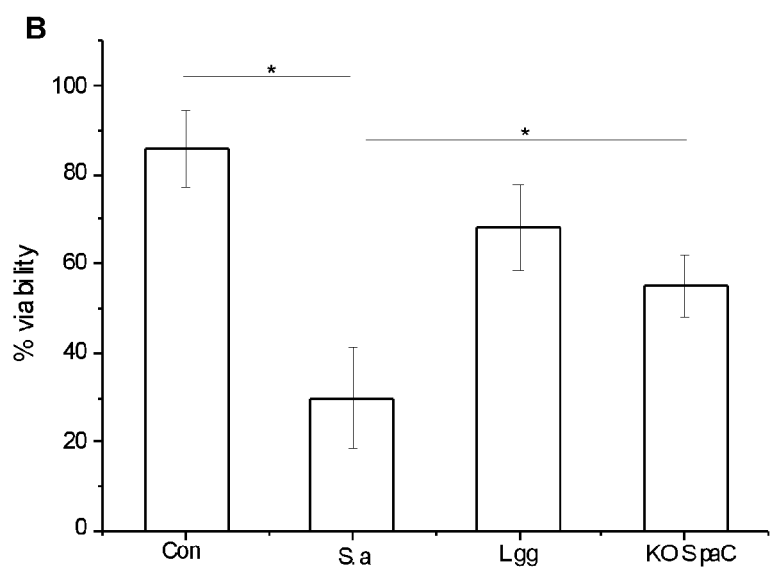

FIG. 4: SpaC protects keratinocytes from the toxic effects of *S. aureus*.

A: Recombinant SpaC (rSpaC) at 50 ug/ml afforded significant protection to keratinocyte monolayer viability in the presence of *S. aureus* (S.a) (p=0.013). However, this was significantly less than the protection afforded by the whole lysate (Lgg lys, p=0.008).

B: By contrast, a SpaC deficient strain of LGG (KO SpaC) was still able to protect keratinocytes.

All data were compared to the viability of the untreated monolayer (Con).

EXAMPLES

Example 1: Methods

Bacterial Cell Culture

*Lactobacillus rhamnosus* GG (ATCC 53103) was cultured anaerobically in Wilkins-Chalgren broth at 37° C., and *Staphylococcus aureus* was cultured aerobically in nutrient broth (Oxoid) as described in Mohammedsaeed et. al. (2014) and Prince et. al. (2011) (Mohammedsaeed M., et. al., (2014). *Appl. Environ. Microbiol.* 80(18):5773 and Prince T. et. al., (2011) *Appl Environ. Microbiol.* 78(15):5119-26). The LGG SpaC knock out was produced as described in Lebeer et. al. (2012) (Lebeer S., et. al., (2012). *Appl Environ. Microbiol.* 78: 185-193). LGG lysate was produced according to the protocol published in Mohammedsaeed et. al., (2014). In some experiments investigating the involvement of proteins, the lysate was placed in a boiling water bath for 5 min, or treated with tryspin (0.2% w/v) in Phosphate buffered saline for 1 h at 37° C. to denature proteins.

Fractionation of the *L. rhamnosus* GG lysate

A 30 ml preparation of LGG lysate was adjusted to pH 5.8 using 0.1% Triflouroacetic acid and applied to a Strata XL column (pore size 100 µm, Phenomenex Ltd, Cheshire, UK). Bound proteins were eluted from the column in 60 ml of 90% methanol at pH 2. The sample was spun in a centrifugal evaporation system for 3 h (Biotek, Bedfordshire, UK) and the resulting sample (5 ml) was applied to a 5 ml Sep-Pak C18 cartridge (pore size 37-55 µm, Fischer Scientific, Loughborough, UK). Proteins were eluted using 5 ml aliquots of increasing concentrations of 10-70% (v/v) acetonitrile containing 0.1% (v/v) TFA solution. Each 5 ml fraction was collected into a separate tube and the eluted fractions were evaporated to remove the acetonitrile for 3 h in centrifugal evaporation system (Biotek, Bedfordshire, UK). The resulting 1 ml of each fraction was subjected to SDS-page analysis and stained with Instant Blue (Harston, Cambridgeshire, UK) to visualise the protein bands. The fractions were maintained at 4° C. for further analysis in adhesion and viability assays. For increased concentration and purification, the most efficacious fractions were further separated by HPLC using a Jupiter 90A column (Phemonenex, Cheshire, UK) with a gradient of 10-99% acetonitrile applied over 50 min.

Tandem Mass Spectrophotometric Analysis of Protein Fractions

Tandem Mass spectrometry (MS/MS) identification of proteins was conducted using the 'gel top' method. Proteins were separated electrophoretically for 10 minutes at 150V by SDS-PAGE and then stained using Instant Blue. Bands of interest were excised from the gel and dehydrated using acetonitrile followed by vacuum centrifugation. Dried gel pieces were reduced with 10 mM dithiothreitol and alkylated with 55 mM iodoacetamide. Gel pieces were then washed alternately with 25 mM ammonium bicarbonate followed by acetonitrile. This was repeated, and the gel pieces dried by vacuum centrifugation. Samples were digested with trypsin overnight at 37° C. Digested samples were analysed by LC-MS/MS using an UltiMate® 3000 Rapid Separation LC (RSLC, Dionex Corporation, Sunnyvale, Calif.) coupled to a LTQ Velos Pro (Thermo Fisher Scientific, Waltham, Mass.) mass spectrometer. Peptide mixtures were separated using a gradient from 92% A (0.1% FA in water) and 8% B (0.1% FA in acetonitrile) to 33% B, in 44 min at 300 nL min$^{-1}$, using a 75 mm×250 µm i.d. 1.7 µM BEH C18, analytical column (Waters). Peptides were selected for fragmentation automatically by data dependant analysis. Data produced was searched using Mascot data base search engine (Matrix Science UK). Data was validated using Scaffold (Proteome Software, Portland, Oreg.).

Growth of Primary Human Keratinocytes, Viability and Adhesion Assays

Primary human keratinocytes and associated adhesion and viability assays were performed exactly as described in Mohammedsaeed et. al. (2014).

Production of Recombinant SpaC

An expression plasmid construct (pKTH5319) consisting of the *L. rhamnosus* GG (ATCC 53103) SpaC gene encoding the backbone (residues 31-302) but lacking the N-terminal signal peptide and C-terminal sorting motif regions was produced in accordance with the protocol mentioned in Kankainen et. al. (2009) (Kankainen M., et. al, (2009) *Proc Natl Acad Sci USA* 106(40): 17193-8) was created. Recombinant SpaC pilin was hexa-histidine-tagged at the C-terminus. Recombinant protein expression in *Escherichia coli* BL21 cells was then induced by addition of 1 mM isopropyl-d-1-thiogalactopyranoside after which the culture was grown overnight at 18° C. Cells were harvested by centrifugation, resuspended in a lysis buffer consisting of 40 mM NaH2PO4 pH 7.4, 150 mM NaCl and EDTA-free protease-inhibitor cocktail tablets (Roche Ltd, Sussex UK). The cell lysate was then centrifuged at 48, 400×g for 20 min. and the cell-free lysate was loaded onto a 5 ml $NiCl_2$-charged HiTrap chelating HP column (GE Healthcare, Amersham, UK) that had previously been equilibrated with a buffer containing 40 mM $NaH_2PO_4$ pH 7.4, 150 mM NaCl. Resin-bound SpaA protein was then eluted with buffer containing 40 mM $NaH_2PO_4$ pH 7.4, 150 mM NaCl, 250 mM imidazole using a linear gradient equivalent to ten column volumes. SpaC containing fractions were determined by SDS-PAGE, pooled and dialyzed against 20 mM HEPES pH 7.0, 150 mM NaCl, 1 mM EDTA. The dialyzed protein solution was then concentrated using an Amicon ultrafiltration device fitted with a 10 kDa molecular-weight cut-off (Amicon technologies Ltd, Kent, UK) and subsequently purified further by a Sephacryl S-200 26/60 gel-filtration column (GE Healthcare) equilibrated with dialysis buffer.

SDS-PAGE and Immunostaining

SDS-PAGE and immunostaining was performed as described in Sultanna et. al. (2013) (Sultanna R. et. al., (2013) *Appl. Environ, Microbiol.* 79(16) 4887-4894) using SpaC antiserum as described in Kankainen et. al. (2009) (Kankainen M., et. al., (2009) *Proc Natl Acad Sci USA* 106(40): 17193-8).

Statistical Analysis

All data was presented as the mean±SEM of three independent experiments with triplicate samples within each independent experiment. Data generated was analyzed by one-way analysis of variance (ANOVA) and post hoc Tukey test using SPSS (IBM SPSS Statistics version 16.0) program. Data was considered significant if the P value was <0.05.

Example 2: Results

Heat, or Protease Treated Lysate does not Protect Keratinocytes from the Effects of *S. aureus*

Figure 1:
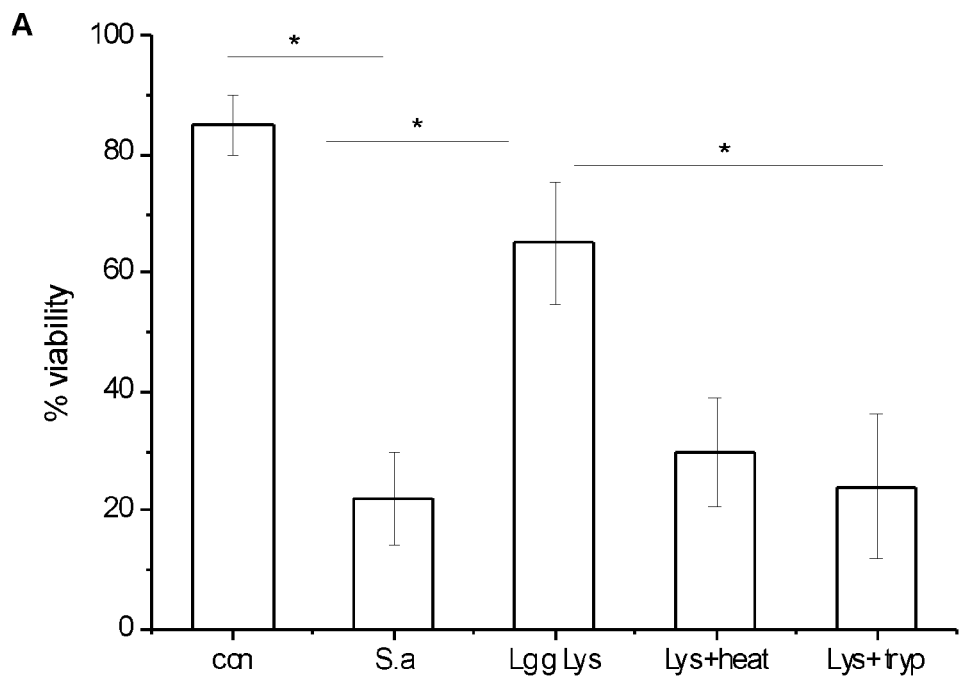
FIG. 1: Proteins mediate the effects of LGG lysate against *S. aureus*.
Figure 1:
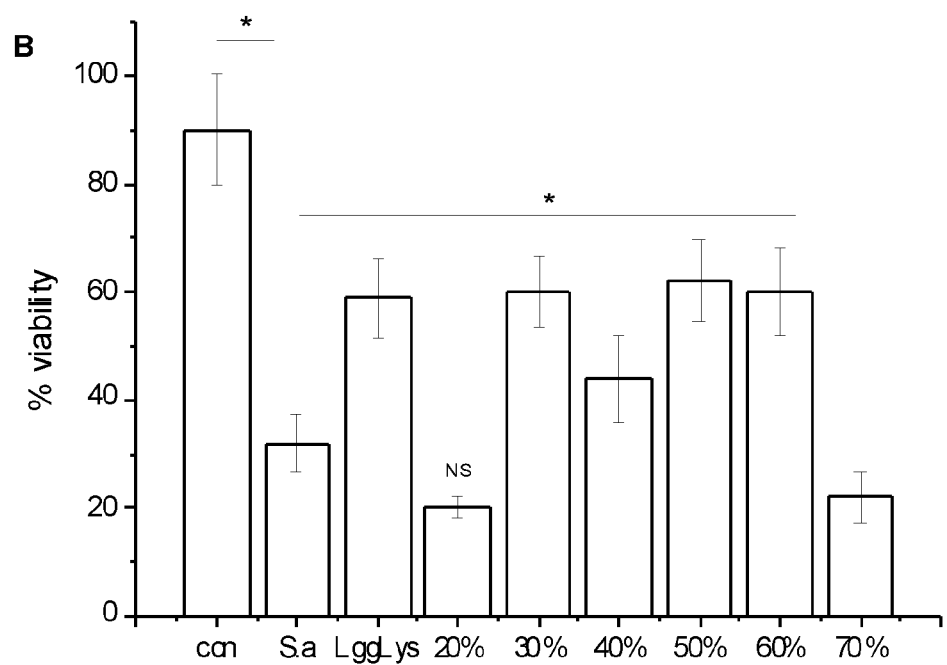

The nature of the efficacious molecules within the LGG lysate mediating its anti-adhesive effects on *S. aureus* was first detected. To this end, the lysate was treated with heat or protease and then its ability to protect keratinocyte monolayer viability in the presence of *S. aureus* investigated. Only c. 30% of the keratinocyte monolayer was viable following 24 h incubation with *S. aureus*. However, in the presence of LGG lysate, monolayer viability increased to c. 65%. Heat or protease treated lysate did not protect monolayer viability (see FIG. 1a), suggesting that proteins within the lysate are the efficacious molecules.

The LGG lysate was subjected to partial fractionation using a hydrophobic interaction column and the proteins were eluted in a gradient of 10-70% acetonitrile. The ability of proteins eluting in each fraction to protect keratinocyte viability was investigated. Proteins eluting in 30-60% acetonitrile were able to protect keratinocyte from the effects of *S. aureus*, however, proteins eluting in other fractions did not (see FIG. 1b).

The 50% Acetonitrile Fraction Both Excludes and Displaces *S. aureus* from Keratinocytes The ability of the 30-60% fractions of the lysate to exclude or displace *S. aureus* from keratinocyte binding sites was investigated. The data in FIG. 2 show that the 50% fraction is the most efficacious at both exclusion and displacement of *S. aureus*. Importantly, when tested in a 'spot on the lawn' assay, this fraction had minimal activity against *S. aureus* growth compared with other fractions that conferred protection to keratinocytes as shown in Table 1 below.

TABLE 1

| Treatment | Diameter of zone of inhibition (mm, n = 3) |
|---|---|
| Whole LGG lysate | 14 +/− 1.6 |
| 20% fraction | 0 |
| 30% fraction | 5 +/− 0.8 |
| 40% fraction | 0 |
| 50% fraction | 0 |
| 60% fraction | 10 +/− 1.7 |
| 99% acetonitrile | 0 |

The 50% Acetonitrile Fraction Contains the Pilus Protein SpaC

To understand the involvement of SpaC in anti-adhesive processes, the 50% fraction was subjected to immunoblotting using an anti-SpaC antibody. This produced a single band, at the correct molecular weight for SpaC, suggesting that the 50% fraction of the lysate contains this protein (see FIG. 3a). To confirm the involvement of SpaC as an anti-*S. aureus* adhesion mechanism, recombinant SpaC was produced and its anti-adhesive activity compared against that of the crude lysate. Recombinant SpaC inhibited adhesion of *S. aureus* to keratinocytes in a dose dependent manner with 50 µg/ml being the most efficacious (FIG. 3b). By contrast, 50 µg/ml of a control protein, Bovine serum albumin did not inhibit staphylococcal adhesion to keratinocytes (see FIG. 3c). However, SpaC was only able to inhibit *S. aureus* adhesion to keratinocytes when added to keratinocytes before, but not after the pathogen.

SpaC Partially Preserves Keratinocyte Monolayer Viability in the Presence of *S. aureus*

The recombinant SpaC was tested to establish whether it could protect keratinocyte monolayers from the toxic effects of *S. aureus*. The effect of 50 µg/ml crude lysate against 50 µg/ml recombinant SpaC was compared. Although the recombinant SpaC could indeed protect keratinocytes, it was significantly less efficacious than the crude lysate (see FIG. 4a). Furthermore, a LGG strain deficient in SpaC production, was still able to protect keratinocyte viability (see FIG. 4b) and did not show significantly reduced ability to inhibit *S. aureus* adhesion.

The 50% Acetonitrile Fraction Contains Additional Potential Anti-Adhesive Proteins Since deletion of SpaC in a LGG mutant strain did not negate the effects of the lysate on keratinocyte viability in response to *S. aureus*, the possibility that other proteins in the LGG lysate may also impact upon adhesion of staphylococci to keratinocytes was assessed. A tandem mass spectrometry (MS/MS) analysis of the proteins contained within the 50% fraction of the LGG lysate was produced. The data is summarised in Table 2 below.

TABLE 2

Proteins identified by Tandem Mass Spectrometry in the 50% acetonitrile fraction of the LGG lysate.

| Protein | Molecular weight (kDa) |
|---|---|
| UDP-glucose 4 epimerase | 90 |
| B-galactosidase chain D | 33 |
| 30S Ribosomal protein S7 | 95 |
| Acyl carrier protein | 9 |
| Glyceraldehyde-3 phosphate dehydrogenase | 36 |
| Elongation factor TU | 44 |
| Triosephosphate isomerase | 27 |
| 50S ribosomal protein S11 | 15 |

TABLE 2-continued

Proteins identified by Tandem Mass Spectrometry in the 50% acetonitrile fraction of the LGG lysate.

| Protein | Molecular weight (kDa) |
| --- | --- |
| Dehydroxyacetone kinase | 21 |
| 50S ribosomal protein L22 | 13 |
| Asparaginyl tRNA synthetase | 50 |
| Enolase | 47 |
| GMP synthase | 58 |
| UPF0342 protein LRH | 13 |
| 30S ribosomal protein S5 | 32 |
| Glucose 1 phosphate thymidylyltransferase | 75 |
| B-galactosidase chain D | 33 |
| DNA-directed RNA polymerase alpha subunit | 38 |
| Phosphoribosylpyrophosphate synthetase | 25 |
| Phosphoglycerate mutase | 46 |
| Aspartyl tRNA synthetase | 64 |
| M29 family amonopeptidase | 21 |
| Glycine cleavage system H | 11 |
| 50S ribosomal protein | 13 |
| UPF0342 protein | 13 |

Note:
These proteins were consistently found in n = 3 column fractionations. The bold text highlights proteins with molecular weights corresponding to abundant proteins in the sample as judged by SDS-PAGE.

To further concentrate and identify proteins of interest a further round of purification of the 50% fraction using Reverse-Phase HPLC and proteins were eluted from a C 18 reverse phase column using a gradient of 0-100% acetonitrile. The concentrated fractions were collected based on ultraviolet absorption at 215 nm and 4 specific peaks containing proteins were collected at between 21-32 minutes of elution. These peaks, named F1-4, (to differentiate their retention times on the column) were used in both staphylococcal adhesion assays and keratinocyte viability assays. The proteins contained within F4 were the most efficacious in both assays (data not shown). Hence, F4 was subjected to analysis both by gel electrophoresis and MS/MS analysis. The proteins contained within F4 are shown in Table 3 below.

TABLE 3

Proteins identified by Tandem mass Spectrometry in the F4 fraction of the lysate Footnote.

| Protein | Molecular weight (kDa) |
| --- | --- |
| Acyl carrier protein | 9 |
| Glyceraldehyde-3 phosphate dehydrogenase | 36 |
| Elongation factor TU | 43 |
| Transcription elongation factor greA | 23 |
| Phosphopentomutase | 43 |
| Triosephosphate isomerase | 27 |
| 50S ribosomal protein S11 | 15 |
| Dihydroxyecetone kinase | 21 |
| 50s Ribosomal protein | 15 |
| Asparaginyl tRNA synthetase | 50 |
| Enolase | 47 |
| UPF0342 protein | 13 |
| 50S ribosomal protein L22 | 13 |

The bold text indicates proteins with molecular weights corresponding to abundant proteins in the fraction as judged by SDS-PAGE.

The proteins highlighted in bold in Table 2, elongation factor Tu, (EF-Tu) glyceraldehyde-3-phosphate dehydrogenase (GAPDH), enolase and triosephosphate isomerase (TPI), are common to both the 50% acetonitrile fraction and the F4 fraction. These proteins are likely to be major constituents of F4 because the most abundant proteins in the F4 fraction (as judged by electrophoresis) correspond to the known molecular weights of these proteins. Of significance, EF-Tu, GAPDH, enolase and TPI are known adhesion molecules in other *lactobacilli*.

Discussion

The inventors have been investigating the potential of LGG cell-free lysates as a topical therapy targeted at prevention/treatment of *S. aureus* infection. For topical applications, a cell-free lysate has many advantages over the use of viable bacteria. Importantly, the safety concerns surrounding use of live bacteria on the skin are negated as are the potential problems associated with formulating live bacteria. However, if probiotics like LGG are to fulfil their potential as topical therapeutic agents, an understanding of the bacterial molecules mediating their effects is a prerequisite.

In the current experiments, the inventors investigated the molecules mediating the anti-adhesive effects of LGG against *S. aureus*. The efficacious molecules appear to be proteins because heat denaturation or protease treatment completely destroyed the activity of the lysate against *S. aureus*. However, the possibility that other molecules such as sugars on the surface of LGG may also be important to its adhesive action cannot be completely excluded. Indeed, exopolysaccharides have been shown to be important for LGG binding to the host in the intestine. Although exopolysaccharides and other molecules may be involved in the activity of the LGG lysate, since glycosidase treatment of the LGG lysate resulted in no significant loss of efficacy against *S. aureus* it was concluded that in the main, the inhibitory action of the lysate against *S. aureus* adhesion is mediated by proteins.

A number of protein adhesins have been previously identified in *lactobacilli*. Of these, the involvement of the pilus protein SpaC as a mucus binding protein has been shown in a number of studies. SpaC may also be involved in the mechanism by which LGG inhibits *S. aureus* adhesion. This is suggested by a number of observations: Firstly, fractionation of the lysate and analysis of the fractions show the most efficacious fraction to contain SpaC. Second, recombinant SpaC inhibits *S. aureus* adhesion in a dose dependent manner and lastly, the toxic effects of *S. aureus* on keratinocyte viability are negated by SpaC, but not a control protein, BSA.

Overall, these data are consistent with a conclusion that SpaC is involved in the mechanism by which LGG inhibits the adhesion of *S. aureus* to keratinocytes but it is almost certainly does not act alone and other proteins are likely to be involved. Of note, the SpaC knockdown still retained an ability to protect keratinocyte viability in the presence of *S. aureus*. This could be explained by a previous observation by the inventors that inhibition of adhesion is not the only mechanism used by LGG to protect keratinocytes from the toxic effects of *S. aureus*. Previous studies showed that the LGG lysate also inhibits the growth of *S. aureus*. This is probably part of the explanation as to why the SpaC knockout LGG strain still retains ability to protect keratinocyte viability i.e. the knock out strain would still retain the molecules that inhibit staphylococcal growth. The inhibition of *S. aureus* growth is almost certainly mediated by completely different molecules to the adhesins because in separate experiments, we could show no inhibition of *S. aureus* growth by the 50% acetonitrile fraction. Indeed, inhibition of pathogenic growth was found to be contained in other discreet fractions of the lysate.

A second piece of evidence suggesting that SpaC is not the entire explanation for the anti-adhesive effects of the LGG lysate comes from the observation that recombinant SpaC cannot replicate the displacement activity of the lysate and the 50% fraction against *S. aureus*. This suggests that other proteins may be involved in the full anti adhesive activities of the lysate. Indeed, several other proteins were found in the 50% fraction and were concentrated further by HPLC into a fraction (F4) which showed the highest efficacy in both adhesion and viability assays. The most abundant proteins in this F4 fraction are likely to be elongation factor Tu, (EFTU) glyceraldehyde-3-phosphate dehydrogenase (GAPDH), enolase and triosephosphate isomerase (TPI) because the major components of the fraction (as judged by gel electrophoresis) were proteins of the same molecular weights as these. Interestingly, SpaC must be a low abundance protein in both the 50% and F4 fractions because Tandem Mass Spectrometry identification of proteins did not detect it. Indeed this technique is known to be reliable only for identification of abundant proteins. However, SpaC was shown to be present by western blotting suggesting it is present in the fraction and hence may be part of the anti-adhesive mechanism.

The proteins EFTU, GAPDH, enolase and TPI have been previously reported to be important for adhesive function in several species of *lactobacilli*. All these proteins have been previously described as so-called 'moonlighting proteins' i.e. proteins with an ability to perform functions unrelated to the canonical function ascribed to the protein. For example, GAPDH is an intracellular enzyme central to glycolysis. However, it is found as a cell surface adhesion protein on several prokaryotes including *L. plantarum* and *L. crispatus*. TPI, another glycolytic enzyme, has been shown to be involved in competitive exclusion and displacement of *Clostridium sporogenes* and *Enterococcus faecalis* from Caco-2 cells by *L. plantarum*. EF-Tu is involved in protein translation but is found at the cell surface as an adhesion mediating attachment of *lactobacilli* to mucins. Many of these moonlighting proteins have been shown to mediate bacterial adhesion to eukaryotic cells by binding to specific eukaryotic proteins such as fibronectin. Although EFTU, GAPDH, enolase and TPI have not been shown to be adhesins specifically in LGG, very recent evidence has demonstrated three of them, (enolase, EFTU, GPDH) to be cell surface proteins of LGG as well as having their normally cytoplasmic location. Such dual localisation is usually suggestive of moonlighting function. Unfortunately, since all these proteins have canonical functions important to central bacterial metabolism, knock down generally results in lethality making their exact contributions to the anti-staphylococcal adhesive function of LGG difficult to demonstrate.

In summary, it is believed that the overall anti-adhesive function of LGG against *S. aureus* may be facilitated by a number of proteins including SpaC, and several moonlighting proteins expressed at the cell surface. These may include TPI, enolase, GAPDH and EFTU although others may also be involved. Observations showed that many fractions were efficacious in our assays and we analysed only the fractions showing the greatest efficacy.

The forgoing embodiments are not intended to limit the scope of the protection afforded by the claims, but rather to describe examples of how the invention may be put into practice.

The invention claimed is:

1. A method of preventing, managing, or treating a skin infection in a subject in need thereof, the method comprising administering to the skin of the subject a composition consisting of a protein fraction derived from a secretion or lysate of *Lactobacillus rhamnosus* GG, wherein the proteins in the protein fraction consist of subtilin biosynthesis protein C (SpaC), glyceraldehyde-3-phosphate dehydrogenase (GAPDH), elongation factor TU (EF-Tu), enolase, and triosephosphate isomerase (TPI).

2. The method according to claim 1, wherein the composition further comprises one or more exopolysaccharides.

3. The method according to claim 1, wherein the composition further comprises one or more pharmaceutically or cosmetically acceptable ingredients or excipients.

4. The method according to claim 1, wherein the infection is a *Staphylococcus* infection.

5. The method according to claim 4, wherein the infection is an *S. aureus* infection.

6. A method of preventing, managing, or treating a skin infection in a subject in need thereof, the method comprising administering to the skin of the subject a composition consisting of subtilin biosynthesis protein C (SpaC), glyceraldehyde-3-phosphate dehydrogenase (GAPDH), elongation factor TU (EF-Tu), enolase, and triosephosphate isomerase (TPI).

* * * * *